3,483,747
CALORIMETRY APPARATUS FOR MEASURING HIGH INTENSITY RADIATION
Bernard H. Soffer, Pacific Palisades, and Irvin M. Winer, Venice, Calif., assignors to Korad Corporation, a corporation of New York
Filed July 11, 1966, Ser. No. 564,302
Int. Cl. G01k 17/00; H01j 39/00; G01t 1/16
U.S. Cl. 73—190                                    4 Claims

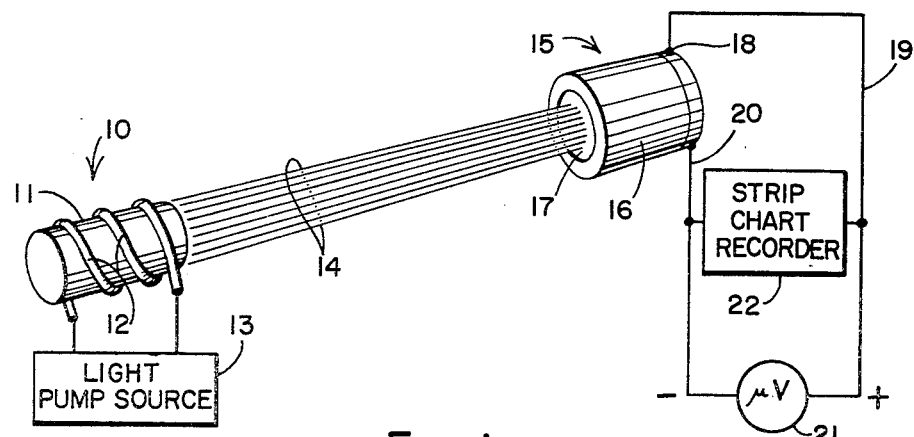
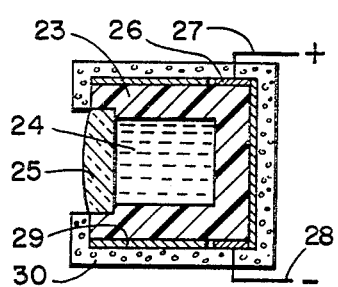
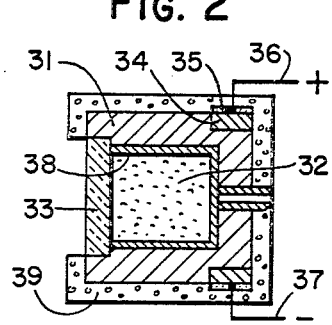
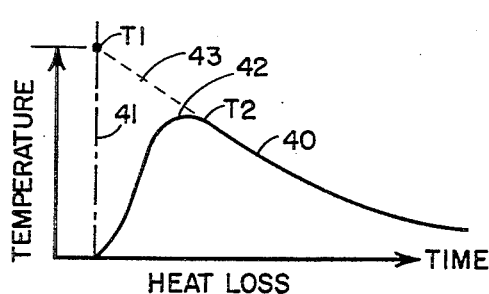
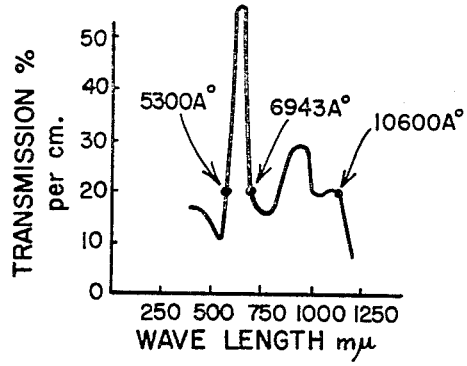
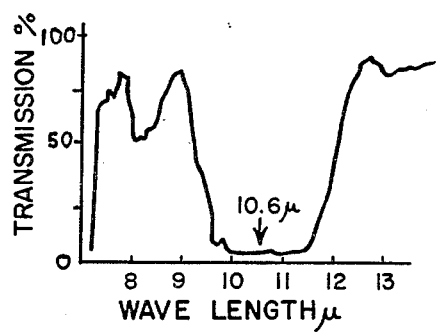
FIG. 1
FIG. 2
FIG. 3
FIG. 4
FIG. 5
FIG. 6
INVENTORS.
BERNARD H. SOFFER
IRVIN M. WINER
BY Elliott & Pastoriza
ATTORNEYS United States Patent Office 3,483,747
Patented Dec. 16, 1969

ABSTRACT OF THE DISCLOSURE

A calorimetry apparatus for determining the absolute energy content of high intensity beams constitutes utilization of a gas in a fixed volume defined by a cell structure. The cell includes a window transparent to the radiation beam to be measured and the gas itself has appropriate absorption characteristics for the wave lengths of radiation in the beam such that a heating of the gas results. The temperature of the cell is thus raised and by detecting with a thermopile the change in temperature, a quantity is provided which will constitute the function of the energy in the beam.

---

This invention relates generally to the measuring of power or intensity of electromagnetic radiation and more particularly, to apparatus for determining the absolute energy content of high intensity coherent radiation such as provided by lasers.

With the introduction of high intensity coherent radiation generators such as masers and lasers, conventional calorimetric methods and apparatus for reliable detection of the power histories of such radiation are not always suitable. The absolute determination of the energy content of high intensity beams is important in order to effect absolute calibration of photodetector power indicators.

While bolometers of the carbon absorbing disc type, metallic integrating spheres and cones, and light pressure meters will serve satisfactorily when the coherent beam of radiation such as a laser beam is of relatively low intensity, the reliability of these devices fails in the case of high intensity beams. For example, under high intensity radiation, vaporization or oxidation of the calorimeter can occur. This deterioration cannot be taken into account in any given observation. Further, the instrumental response changes in an unaccountable manner from observation to observation. In addition, with known calorimetric devices employing solids, there are not always available solid materials having appropriate absorption characteristics for the particular wave lengths involved in the radiation to be measured.

With the foregoing in mind, it is a primary object of this invention to provide apparatus for determining the absolute energy content of high intensity beams, ranging from continuous wave laser radiation to radiation of pulse widths of the order of a milli-nanosecond without adverse effects on the detecting and measuring equipment by the beam of radiation itself.

Briefly, this object is attained by calorimetric means in which a gas is confined within a fixed volume defined by a cell structure. The cell structure includes a window transparent to the radiation beam to be measured and the gas itself has appropriate absorption characteristics for the wave lengths of radiation in the beam such that a heating of the gas results. The temperature of the cell is thus raised and by detecting, preferably with a thermopile, the change in temperature, a quantity is provided which will constitute a function of the energy in the beam.

The gas involved depends on the type of radiation involved. In each case, suitable mixtures of different gases may be employed to provide desired absorption characteristics at the wave lengths of the particular radiant energy beams to be analyzed.

A better understanding of the apparatus involved in this invention will be had by now referring to preferred embodiments as illustrated schematically in the accompanying drawings, in which:

FIGURE 1 is a diagrammatic perspective view of a laser and calorimeter for carrying out the invention;

FIGURE 2 is a cross-section of one type of cell which may be incorporated in the structure of FIGURE 1;

FIGURE 3 illustrates the absorption characteristics of a liquid solution used in the cell of FIGURE 2;

FIGURE 4 is a cross-section of another type of cell in accord with the present invention which may be incorporated in the apparatus of FIGURE 1;

FIGURE 5 illustrates the absorption characteristics of a gas used in the cell of FIGURE 4; and, FIGURE 6 illustrates a cooling curve useful in explaining the manner in which correction for heat loss in the detection of temperature changes in the cell is carried out.

Referring first to FIGURE 1, there is illustrated means for generating a coherent beam of electromagnetic radiation such as a laser 10 which may comprise a ruby rod 11 surrounded by a helical flash lamp 12 powered from a light pump source 13. The ends of the rod 11 are provided with dielectric coatings to define an optical cavity and enable the stimulated emission of radiation to take place. The output beam is indicated at 14. The laser system 10, while not illustrated in complete detail, may provide a continuous wave or giant pulses of laser radiation.

To provide a measurement of the absolute energy content in the beam 14, there is provided a calorimeter, designated generally by the numeral 15. This structure includes a cell 16 defining a fixed interior volume and provided with a transparent window 17 for receiving the beam 14. The fixed volume within the cell 16 includes a fluid such as a liquid or gas having absorption characteristics at wave lengths corresponding to one or more wave lengths in the beam 14. Absorption of the radiant energy results in a heating of the cell 16 and this raising of the cell temperature is detected by a suitable thermopile 18 having output leads 19 and 20. A micro-voltmeter 21 is connected across the leads 19 and 20 and provides a reading proportional to the electrical voltage developed by the thermopile. A strip chart recorder 22 may be paralleled across the output leads 19 and 20 as shown.

In the operation of the system of FIGURE 1, the coherent beam 14 passes through the window 17 which is transparent to the particular wave length or wave lengths of radiation involved in the beam to be absorbed in the fluid medium within the cell 16. The resulting increase in temperature in the fluid and cell is detected by the thermopile 18 and an output quantity in the form of the electrical signal is indicated by the micro-voltmeter 21 as described.

The calorimeter may readily be calibrated by employing electrical heating coils wherein a known amount of energy provides a given output signal so that the resulting readings on the micro-voltmeter 21 or as recorded on the strip-chart recorder 22 will provide an absolute indication of the energy content in the beam 14.

As a specific example of one type of cell 16, reference is had to FIGURE 2 wherein there is illustrated a cell 23 incorporating a fluid 24 and having a window 25 corresponding generally to the window 17 in FIGURE 1. In the particular embodiment shown, a thermopile 26 is secured directly to the cell 23. The output from the thermopile is taken from leads 27 and 28.

In general depending upon the wave lengths involved in the radiant energy beam to be measured, the materials making up the cell and fluid are dictated by the following properties: the cell body must be chemically inert to the absorbing fluid 24; unaffected by residual light radiation reaching the surface; of a material having excellent heat conductivity; and of a material having excellent electrical insulating properties, or including an insulating means, in order that the thermopile may be properly insulated. The absorbing fluid medium itself must be chemically stable to the laser radiation; must have an appropriate absorption coefficient, that is, must have high absorption cross-section to the particular radiation under investigation; and the absorption itself must be unsaturable at the highest contemplated beam intensities introduced into the medium.

As opposed to conventional type calorimeters, it is found that difficulties heretofore encountered with respect to destruction of the calorimeter proper by the high intensity beam and inappropriate absorption characteristics of the material are overcome when a fluid such as a liquid or gas is employed in the cell. FIGURE 2 illustrates the construction for a liquid cell calorimeter. Liquids constituting aqueous solutions of mono-metallic salts satisfy the requisites of the absorbing fluids in the optical and near infra-red wave length range. Suitable combinations of such salts permit applicability of a cell over considerable wave length regions and exhibit no objection to mixing in solution.

For example, the absorption characteristics of a specific fluid useful in the cell of FIGURE 2, are illustrated by the graph in FIGURE 3. This solution constitutes, by mass weight, 5% $Ni:SO_4.6H_2O$, 5% $CoSO_4.7H_2O$, 1% $CuCO_4.5H_2O$, and 89% $H_2O$. This liquid mixture, as indicated in FIGURE 3, has relatively equal absorption characteristics for radiation of wave lengths of 5300 A., 6943 A., and 10,600 A., such as provided by a neodynium laser, ruby laser, and a neodynium doubled frequency laser. In other words, the absorption characteristics are all of substantially the same value for these three wave lengths and thus the use of this liquid at 24 in the cell 23 of FIGURE 2 will serve equally well for determining the intensities of the radiation beams from the particular lasers described.

The selection of desired absorption co-efficients is accomplished by varying the concentration of the various salts involved. This selection is determined by the basic consideration that essentially total absorption of incident radiation or light be assured over the minimum path length available to the light. This minimum absorption co-efficient consistent with such condition is selected on two grounds. First, the uniformity of the initial distribution of heat in the absorbing liquid, and second, the upper limit to permissible energy density incident on the cell (condition of localized boiling of the liquid at the entrance window). This latter quantity in the case of pulsed laser radiation is given by:

$$\sigma = \frac{(T_B - T)\rho S}{\alpha}$$

Where:

$\sigma$ = incident energy density.
$T_B$ = boiling temperature of the absorbing solution.
$T$ = initial temperature of the absorbing solution.
$\rho$ = density of the absorbing solution.
$S$ = specific heat of the absorbing solution.
$\alpha$ = the absorption co-efficient of the absorbing solution.

It will be evident from the foregoing that higher incident energy densities are tolerable for low concentrations; that is, low values of $\alpha$.

With respect to the material of the cell, both nickel and copper have been used successfully. However, when metal cells are used, the solution is limited to salts of the particular metal selected. The presence of other metal salts in the solution may lead to the eventual chemical interaction of the cell and solution.

This problem has been overcome by making the cell 23 of FIGURE 2 of beryllium oxide. This oxide constitutes a white, chemically inert ceramic, with a heat conductivity similar to that of aluminum and an electrical resistivity corresponding to that of hard rubber. It will thus satisfy all the requirements of the cell and is readily obtainable. On the other hand, it is found that the beryllium oxide cell exhibits a small degree of porosity. This problem is overcome in the cell of the present invention by coating the exterior of the cell with a thin layer of Teflon as shown at 29 except at the regions where the thermopile junctions are epoxied to the cell. With this covering, the porosity is effectively eliminated and the cell material is found to be completely satisfactory. When a ceramic cell is used, the thermopile 26 may be secured directly to the cell as shown.

The transparent window 25 for receiving the high intensity radiant energy beam may constitute any suitable high quality optical glass. Fused silica and sapphire have also been found satisfactory. Glass has been used to intensity levels as high as 1000 megawatts/cm.$^2$ and sapphire to levels as high as 2000 megawatts/cm.$^2$ in observations of ruby giant pulse lasers without exhibiting any deterioration. In FIGURE 2, it will be noted that the window 25 is of a plano-convex configuration. This design achieves divergence of the reflected portion of the beam.

The response of the calorimeter is an important consideration in calibrating the instrument. As will become clearer later on in the description, a cooling of the cell upon cessation of the incident radiant beam can result in error. To inhibit cooling by convection, the entire cell could be suspended in a vacuum. However, it has been found that by covering the cell with a Styrofoam jacket as shown at 30, convection cooling is inhibited to a sufficient degree.

Referring now to FIGURE 4 there is shown a calorimeter in accordance with the present invention comprising a cell 31 incorporating a gas 32. A window 33 provides an ingress means for radiation to the gaseous medium 32. In the preferred embodiment of FIGURE 4, the cell 31 constitutes a copper block, although nickel or other metal could be used. Because this material is electrically conductive there is provided an anodized aluminum ring 34 for securing a thermopile 35 to the cell 31 to provide proper heat conductivity to the thermopile and yet maintain it properly electrically insulated from the cell. As shown, suitable leads 36 and 37 extend from the thermopile. Preferably, the interior of the cell is lined with gold as indicated at 38. This gold lining provides a more chemically inert surface to gas in the cell than the surface of the cell itself when copper or nickel, for example, is employed.

The gas 34, by way of a specific example, is propene ($CH_2:CHCH_3$). The use of this gas as a fluid medium enables measurement of laser radiation from a $CO_2$ laser wherein an output of over 100 watts at 10.6 microns is provided. Liquids are generally so highly absorbent at this wave length and power level that local boiling and extremely non-uniform heat distributions prevent the effectiveness of their use in absorption type cells.

FIGURE 5 illustrates the absorption characteristics over a length of ten centimeters and at approximately one atmosphere pressure for the propene gas employed in the cell of FIGURE 4. It will be noted that at the laser radiation of 10.6 microns for the $CO_2$ laser, a marked degree of absorption over a range on both sides of this wave length charactrizes the gas. In particular, at 10.6 microns, the absorption coefficient $\alpha$ per centimeter is 1.5. The novel use of this gas in the calorimetric techniques described is particularly advantageous since its absorption properties are appropriate at one atmosphere pressure. As a result, it is easy to fill the cell and no serious sealing problems are involved.

The manner in which the calorimeters of FIGURES 2 and 4 are properly calibrated with respect to the fluid medium employed and responses involved will now be described in more detail. The calibration constant of the devices is given by the following expression:

$$K \text{ (joules/volt)} = \frac{1}{k(1-R)} \Sigma C_i \text{ (joules/}°C\text{.)}$$

Where:

$K$=calibration constant.
$k$=sensitivity of thermopile (volts/°C.).
$R$=reflection coefficient of window.
$C_i$=heat capacities of participating components.

If it is assumed that no heat loss occurs during the equilibration interval of the response of the calorimeter, the calibration constant K is precisely determined by the quantity on the right-hand side of the above expression. As mentioned, by employing suitable electrical heating coil techniques and by careful matching of materials used with specific heats and thermocouple constants available in the literature, calibrations can be made valid to about 1%.

However, heat loss referred to heretofore prevents the practical laboratory calorimeter from ever reaching a true elevated temperature equilibrium. The simplest quasi-equilibrium condition available is provided by Newton's law of cooling. By designing the cell so that cooling conditions are substantially defined by Newton's law of cooling, a suitable correction for heat loss can be carried out. To lessen the rate of heat loss and thus increase the time constant, the Styrofoam jacket 30 is provided on the cell of FIGURE 2, as described, and similar jacket 39 is provided about the gas cell of FIGURE 4.

With further reference to the foregoing, there is illustrated at 40 in FIGURE 6 a simple cooling curve following Newton's law. At the time indicated by the vertical dashed line 41, the laser radiation has ceased and in the absence of any response time and heat loss the temperature would be T1. The measured temperature change however follows the curve 40 because of the response time and heat loss involved. The measured temperature of the cell T2, as a consequence, would be at the point 42. By now tracing back on the curve 40 as indicated by the dashed line 43 to the temperature T1, proper correction can be effected in calibrating the instrument.

The heat loss correction for gas cells is considerably less than for liquid cells because of the convective transfer of heat in the gas resulting in extremely rapid response time for the gas.

From the foregoing description, it will thus be evident that the present invention has provided practical and accurate calorimetry techniques for measuring the energy content of high intensity electromagnetic coherent radiation. It should be understood that different gaseous mixtures in accordance with the wave lengths involved in the beams to be investigated may be provided in the gas calorimeter as described. The invention accordingly is not to be thought of as limited to the specific examples set forth merely for illustrative purposes.

What is claimed is:

1. An apparatus for measuring the energy content of a high intensity laser beam of electromagnetic radiation comprising, in combination: a cell defining a fixed volume; a gas filling said fixed volume said gas having an absorption for radiation of wave length corresponding to a wave length in said beam, said cell being of a material chemically inert to said gas and of high heat conductivity; a thermopile; and means for securing said thermopile to said cell for providing an output quantity constituting a function of the temperature of said cell, said cell having a window for receiving said beam, absorption of energy in said beam by said gas raising the temperature of said cell such that said quantity provides a measure of the energy content of said beam, the use of said gas providing a substantially faster response time of said apparatus over that of non-gaseous absorption media if used in said cell.

2. An apparatus according to claim 1, in which said beam includes a wave length of 10.6 microns, said gas comprising propene gas ($CH_2{:}CHCH_3$) under approximately one atmosphere pressure.

3. An apparatus according to claim 1 in which said means for securing said thermopile to said cell constitutes an anodized aluminum ring having high electrical insulating and high heat conductivity properties.

4. An apparatus according to claim 3, in which the material of said cell constitutes copper having a thin coating of gold over its interior surface; and a retaining jacket of Styrofoam about said cell.

References Cited

UNITED STATES PATENTS

| | | | |
|---|---|---|---|
| 3,282,100 | 11/1966 | Baker | 73—190 |
| 3,313,154 | 4/1967 | Bruce | 73—190 |
| 3,094,001 | 6/1963 | Woodcock et al. | 250—83.3 |
| 3,391,279 | 7/1968 | Detrio | 250—83.3 |

OTHER REFERENCES

E. K. Damon and J. T. Flynn: A Liquid Calorimeter for High-Energy Lasers, in Applied Optics, February 1963, vol. 2, No. 2, pp. 163–164.

RICHARD C. QUEISSER, Primary Examiner

J. P. BEAUCHAMP, Assistant Examiner

U.S. Cl. X.R.

250—83.3

UNITED STATES PATENT OFFICE
CERTIFICATE OF CORRECTION

Patent No. 3,483,747            December 16, 1969

Bernard H. Soffer et al.

It is certified that error appears in the above identified patent and that said Letters Patent are hereby corrected as shown below:

In the heading to the printed specification, lines 5 and 6, "assignors to Korad Corporation, a corporation of New York" should read -- assignors to Union Carbide Corporation, a corporation of New York --.

Signed and sealed this 26th day of May 1970.

(SEAL)
Attest:

Edward M. Fletcher, Jr.

Attesting Officer

WILLIAM E. SCHUYLER, JR.

Commissioner of Patents